Dec. 17, 1929.  R. C. TRAVIS  1,739,741
AUTOMOBILE SEAT
Filed April 25, 1927
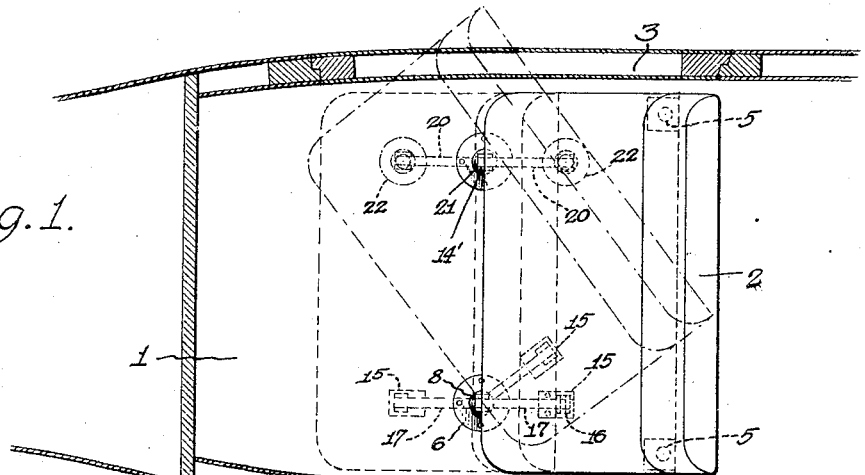
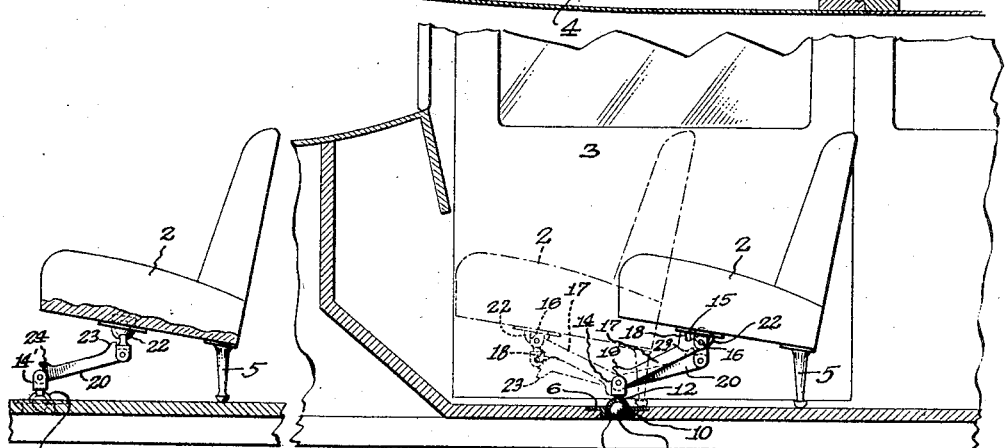
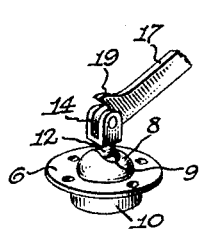
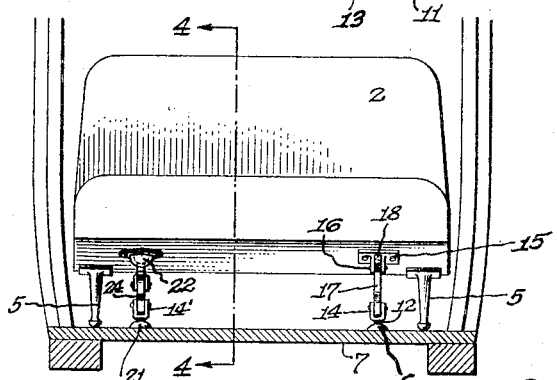
Inventor
Ray C. Travis,
By
Attorneys Patented Dec. 17, 1929

1,739,741

UNITED STATES PATENT OFFICE

RAY C. TRAVIS, OF FERNDALE, MICHIGAN

AUTOMOBILE SEAT

Application filed April 25, 1927. Serial No. 186,207.

The present invention pertains to a novel shifting and swinging seat designed particularly for installation in closed automobiles of the coach type, although it may have application in connection with vehicles in general and is to be regarded as suitable for such broad use rather than restricted to motor vehicles.

Automobiles of the coach body type, namely, of the construction embodying doors at the ends of the driver's section, are provided with a slightly tiltable driver's seat adjacent which is a separate seat having a hinged back. In order that access to the rear seats may be attained, this hinged back is swung down and permits the rear seats to be reached from the adjacent door. Ordinarily, the rear seats cannot be approached from the door at the driver's left hand when the driver is seated.

The present invention provides a construction whereby the rear seats may be approached from either of the doors whether the driver is seated or not and further involves a simplification of the front seat construction whereby a single seat extending transversely of the body and capable of accommodating two or three persons is substituted for the two separate seats which are now in use and can accommodate only two persons. In the accomplishment of these objects of the invention, I mount the single transverse seat in such a manner that it may be readily shifted to position forwardly of its normal position and thus permit access to the rear seats from both doors.

This movement of the seat is preferably employed when the driver has not yet taken his place. Should he happen to be seated at the wheel, the seat is swung by the special supporting construction, in a substantially horizontal plane and around the left hand end as a pivot. The swinging of the seat in this manner also permits approach to the rear seats from both doors.

The invention is fully disclosed in the following description in the accompanying drawings, in which Figure 1 is horizontal section of an automobile body showing in elevation the device of the invention mounted therein;

Fig. 2 is a longitudinal section of an automobile body showing the device of the invention in elevation;

Fig. 3 is a transverse section of the body showing the device of the invention in front elevation;

Fig. 4 is a section on the line 4—4 of Fig. 3, and

Fig. 5 is a perspective view of one of the connections between the seat and floor of the vehicle body.

Reference to these views will now be made by use of like characters which are employed to designate corresponding parts throughout.

This device is constructed, as already indicated, for use in automobiles of the coach type wherein entrance to a closed body is possible by doors at the ends of the front seat. In order to overcome the difficulties and inconveniences described above, I provide at the front end of an automobile body 1 of the coach type, a single seat 2 extending across the body. As usual in bodies of this type, two doors 3 and 4 are provided in the sides thereof at the front end.

No doors rearward of the members 3 and 4 are built in the body, so that these two doors must be used for access to the rear seat.

The rear edge of the seat is provided at its bottom with legs 5 on which the seat is supported in this region and the means for providing the support at the forward edge embodies constructions which are novel in the present invention.

Beneath the forward edge of the seat when the latter is in its normal position, a pair of socket members 6 are mounted in the floor 7 of the vehicle body and are arranged in a line extending transversely of the body. Each such socket member has a dome 8 with a slot 9 at its high point and is formed at its lower surface with an internally threaded collar 10 as shown more clearly in Figs. 2 and 5. Within each socket member is mounted a ball 11 covered in part by the dome 8 and having a stem 12 extending through the slot 9. A seat member 13 threaded into the collar 10 and suitably concaved to engage substantially the lower half of the ball prevents this member from dropping. The upper end of the stem 12, disposed exteriorly of the dome 8, is provided with a double ear 14.

To the bottom of the seat 2 is secured an attaching plate 15 having a pair of spaced ears 16 which are co-planar with the elements of the double ear 14. A link 17 has its ends pivoted at the two pairs of ears and thus serves as a supporting member for the seat. The upper end of the link has a stop finger 18 which abuts the plate 15 when the seat is in its normal standing position shown in Fig. 2. The lower end has a similar finger 19, the function of which will presently be described.

The link 20 received in the anchoring device designated in general by the numeral 21, beneath the other end of the seat has a ball and socket connection 22 to the bottom of the seat. This link has at its upper end a finger 23 similar to the member 18 and abutting an element of the joint 22 when the seat stands in its normal position as shown in Fig. 4.

The seat in its normal position obstructs passage from the doors to the rear seats. Access to the rear seats is generally made possible by providing two front seats, one of which may be tilted forwardly or is equipped with a tilting back. In the present case the entire seat may be moved to the forward position shown in dotted lines in Fig. 2 by swinging the seat in the vertical arc determined by the links 17 and 20. When the links reach this forward position the stop finger 19 at the lower end of the link 17 and the finger 24 at the lower end of the link 20 abut the pivotal members 14 and 14' to which they are respectively attached; and the forward movement of the links is thus limited. The legs 5, returning in a downward direction on the descending side of the arcuate path of the seat construction, re-engage the floor 7 as also shown in dotted lines in Fig. 2.

If the driver already occupies the left hand end of the seat 2 and another passenger is admitted, the seat may be swung around the left hand end as a pivot and brought to the position shown in dotted lines in Fig. 1. Such movement is made possible by the ball and socket joint 22 between the link 20 at the right hand end of the seat, which connection in conjunction with the swivel connection therebeneath, permits an arcuate movement of the right hand end of the seat on a pivot point constituted by the swivel connection between the left hand link 17 and the floor 7. In this movement, the horizontal arcuate path of the right hand end of the seat causes the link 20 to be swung in a plane longitudinal of the seat, whereby the height of said right hand end progressively increases and decreases, causing this end to move in a vertical arc. With the seat 2 now in the position described, the rear seat may be approached through either door 3 or 4.

With the seat in either of its adjusted positions, the entrance at the doors may be still further increased by swinging both ends of the seat upwardly and forwardly at the same time. This feature is useful in special cases, as, for example, when parcels are carried into the vehicle, or when a new seat is installed as substitute equipment in a car too small to permit entrance through both doors by the regular adjustment of the seat.

Although a specific embodiment of the invention has been illustrated and described, it is to be understood that various alterations in the details of construction may be made without departing from the scope of the invention as indicated by the appended claims.

What I claim is:—

1. In a vehicle body, a seat positioned transversely thereof, anchoring members having a swivel mounting in the floor of said body, links connecting said members to said seat, one of said links having a universal connection with said seat, whereby the seat may be swung in a substantially horizontal arc.

2. In a vehicle body, a seat positioned transversely thereof, anchoring members having a swivel mounting in the floor of said body, links pivotally connecting said members to said seat, one of said links having a universal connection with said seat.

3. In a vehicle body, a seat positioned transversely thereof, anchoring members having a swivel mounted in the floor of said body, links connecting said members to said seat, one of said links having a universal connection with said seat, whereby the seat may be swung in a substantially horizontal arc, and stop members provided at the ends of said links and engageable alternately with said anchoring members and seat.

In testimony whereof I affix my signature.

RAY C. TRAVIS.